Jan. 15, 1952 M. F. WILCOX 2,582,810
HYDRAULIC DRIVE UNIT FOR WASHING MACHINES
Filed July 23, 1945 8 Sheets-Sheet 1

INVENTOR.
Merton F. Wilcox.
BY
Harness, Dickey & Pierce.
ATTORNEYS.

Jan. 15, 1952     M. F. WILCOX     2,582,810
HYDRAULIC DRIVE UNIT FOR WASHING MACHINES
Filed July 23, 1945     8 Sheets-Sheet 3

INVENTOR.
Merton F. Wilcox.
BY
Harness, Dickey & Pierce.
ATTORNEYS.

Jan. 15, 1952     M. F. WILCOX     2,582,810
HYDRAULIC DRIVE UNIT FOR WASHING MACHINES
Filed July 23, 1945     8 Sheets-Sheet 4
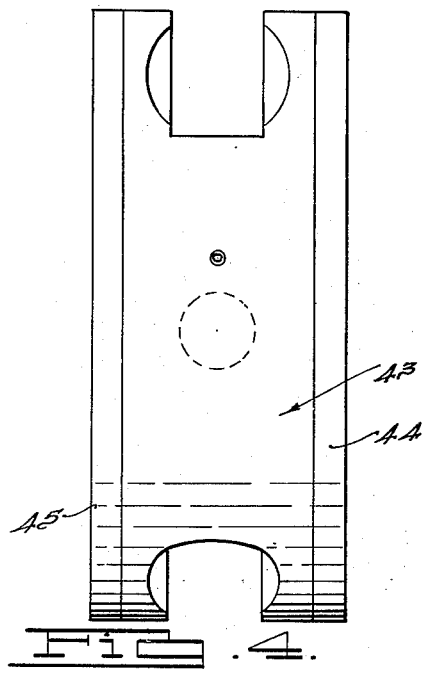
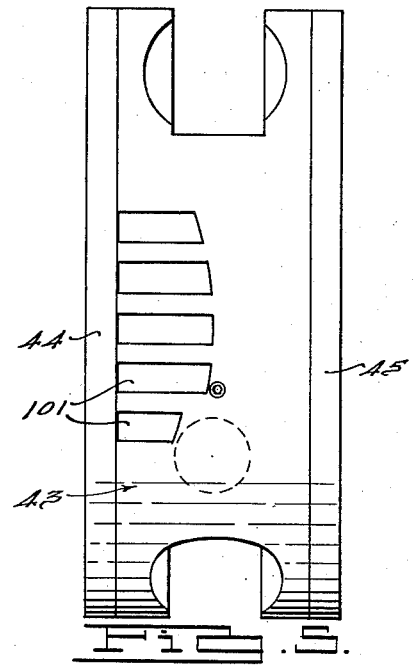
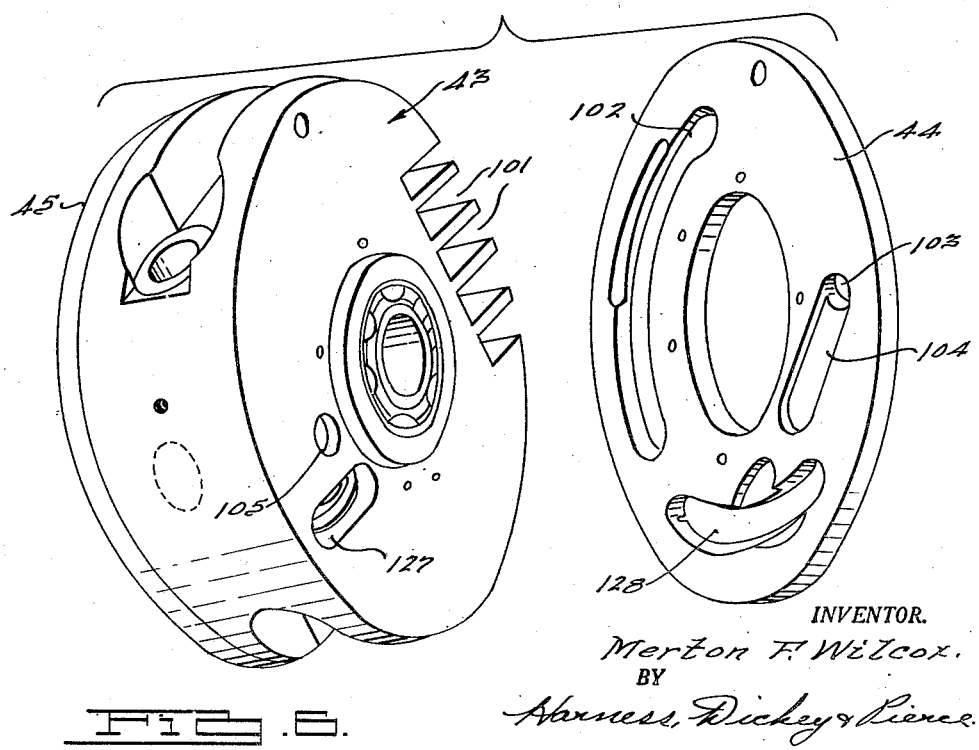
INVENTOR.
Merton F. Wilcox.
BY
Harness, Dickey & Pierce.
ATTORNEYS.

Jan. 15, 1952     M. F. WILCOX     2,582,810
HYDRAULIC DRIVE UNIT FOR WASHING MACHINES
Filed July 23, 1945     8 Sheets-Sheet 5
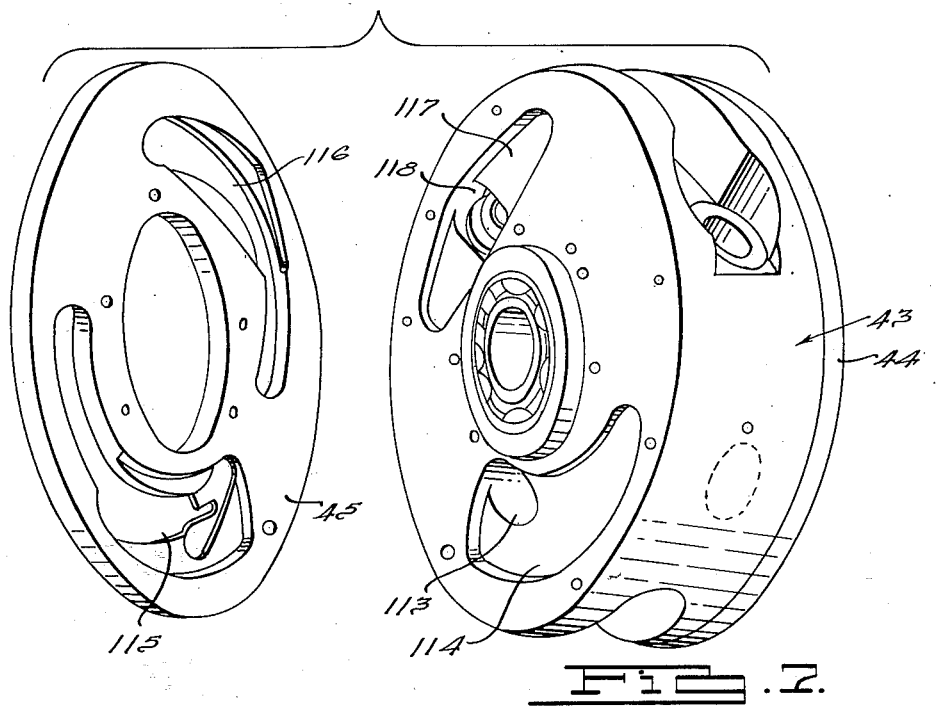
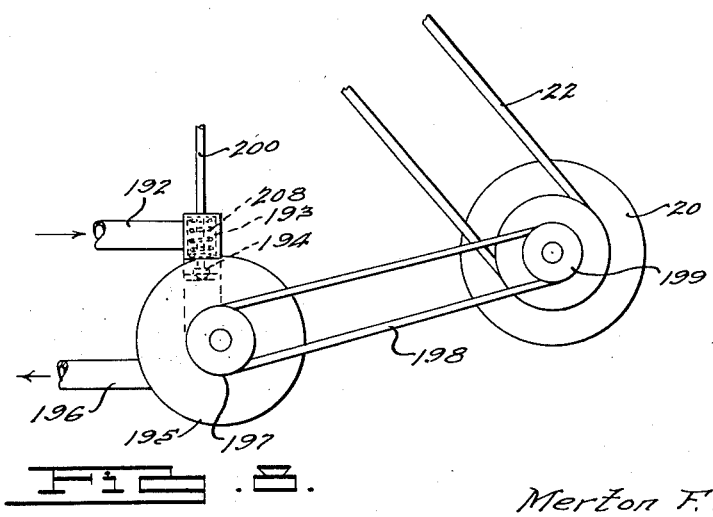
INVENTOR.
Merton F. Wilcox.
BY
Harness, Dickey & Pierce.
ATTORNEYS.

Jan. 15, 1952   M. F. WILCOX   2,582,810
HYDRAULIC DRIVE UNIT FOR WASHING MACHINES
Filed July 23, 1945   8 Sheets-Sheet 6
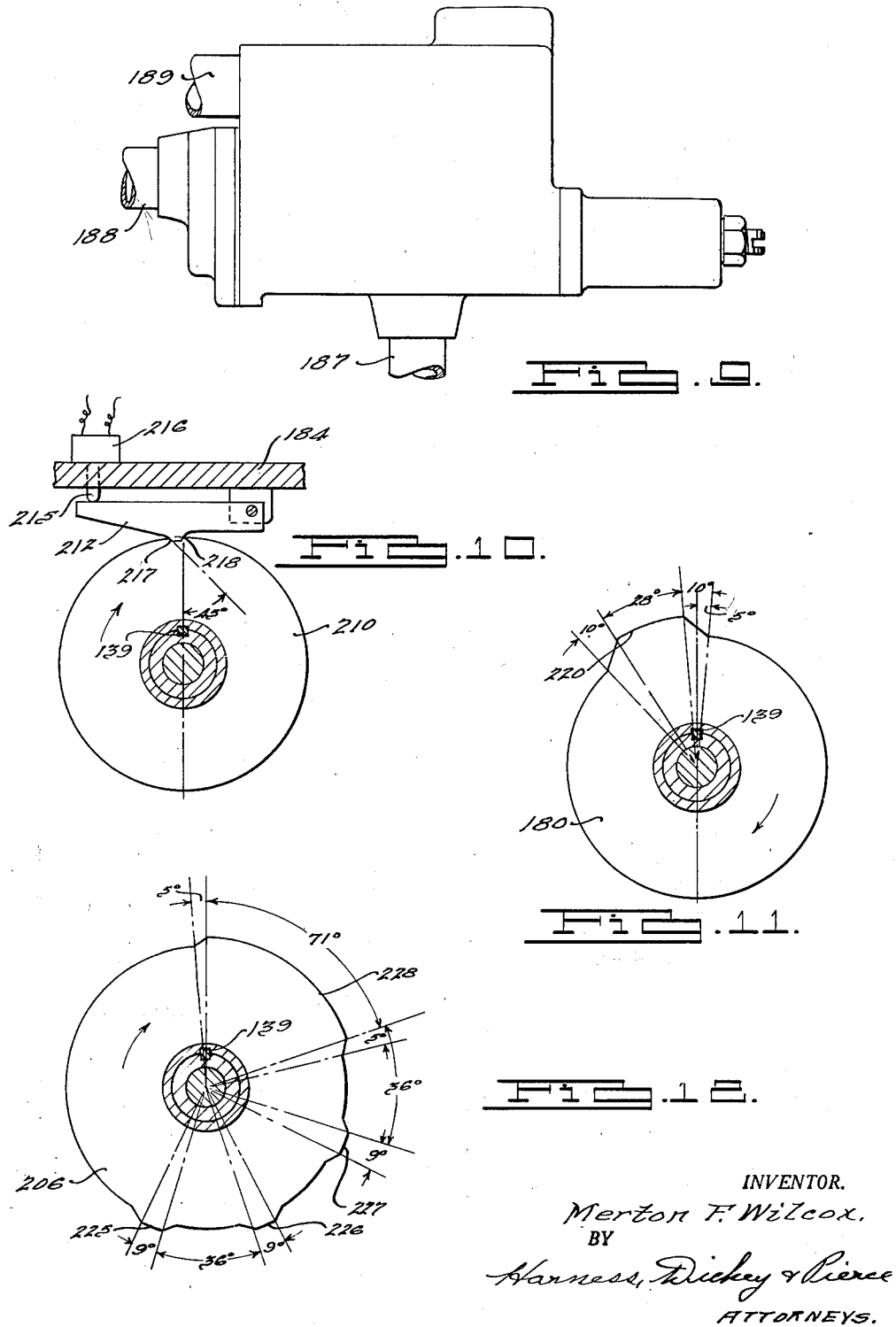
INVENTOR.
Merton F. Wilcox.
BY
Harness, Dickey & Pierce
ATTORNEYS.

INVENTOR.
Merton F. Wilcox.
BY
Harness, Dickey & Pierce
ATTORNEYS.

Patented Jan. 15, 1952

2,582,810

UNITED STATES PATENT OFFICE 2,582,810

HYDRAULIC DRIVE UNIT FOR WASHING MACHINES

Merton F. Wilcox, Grosse Pointe, Mich., assignor, by mesne assignments, to Horton Manufacturing Company, Fort Wayne, Ind., a corporation of Indiana Application July 23, 1945, Serial No. 606,525

5 Claims. (Cl. 68—12)

The invention relates to machines for washing clothes or the like, and it has particular relation to a machine which operates automatically according to a predetermined cycle.

In certain respects the invention is related to the automatic washing machine embodied in the application for patent of Hyman D. Brotman, Serial No. 573,362, filed January 18, 1945 and now abandoned.

In that application for patent an automatic washing machine is provided which includes a rotary receptacle for the clothes which is driven first in one direction and then in the other throughout the washing and rinsing stages, and which then is driven in one direction at a higher speed for the purpose of centrifugally drying the clothes. The mechanism embodied in that application for patent for driving the receptacle is of mechanical character and includes clutching devices for effecting the reversing rotation and finally the high speed drying rotation. The cyclic operation is effected by means of a cam shaft which controls certain clutching devices, a water inlet valve, water outlet valve, etc.

The present invention principally is concerned with the use of hydraulically operated means for driving a clothes receptacle, and one of the principal objects of the invention is to provide an automatically operated washing machine which includes this type of driving means.

Another object of the invention is to provide a hydraulically actuated washing machine which automatically is operable to effect reversing rotation of the clothes receptacle during washing and rinsing of the clothes, and then rotation of the receptacle at high speed in one direction so as to effect drying of the clothes.

Another object of the invention is to provide a machine of the last mentioned character which so operates that the receptacle is always driven in the same direction during the drying stage of its operation.

Another object of the invention is to provide a hydraulically operated unit for driving a clothes receptacle in a washing machine which is embodied in a small compact casing adapted to be readily installed or removed from the machine.

Another object of the invention is to provide an automatic hydraulically operated washing machine which involves a relatively small number of parts so as to thereby reduce wear on the machine and to reduce the likelihood of the machine becoming inoperative at any time.

Another object of the invention is to provide an automatic washing machine which is comparatively quiet in its operation through the use of hydraulically operated driving means.

Another object of the invention is to provide an automatic washing machine having a reversely rotatable receptacle wherein shock is minimized by the use of fluid driving means.

Other objects of the invention will become apparent from the following specification, from the drawings relating thereto, and from the claims hereinafter set forth.

For a better understanding of the invention reference may be had to the drawings wherein:

Fig. 4 is a side view of the valve body and valve plates embodied in the hydraulic drive unit;

Fig. 5 is a view of the same valve body and valve plates but taken from the opposite side thereof;

Fig. 6 illustrates the structure seen in Fig. 4 when tilted and with one of the valve plates separated from the body;

Fig. 7 is a view similar to Fig. 6 showing the valve body tilted in the opposite direction with the other valve plate separated from the body;

Fig. 8 is a detail view illustrating generally the water draining means;

Fig. 9 is a plan view of the inlet valve which controls the flow of water into the tub;

Fig. 10 is a side view showing the cam for controlling the switch for an electric motor which drives the hydraulic pump;

Fig. 11 is a side view showing the cam which controls the inlet of water to the tub when the washing operation is initiated;

Figure 1:
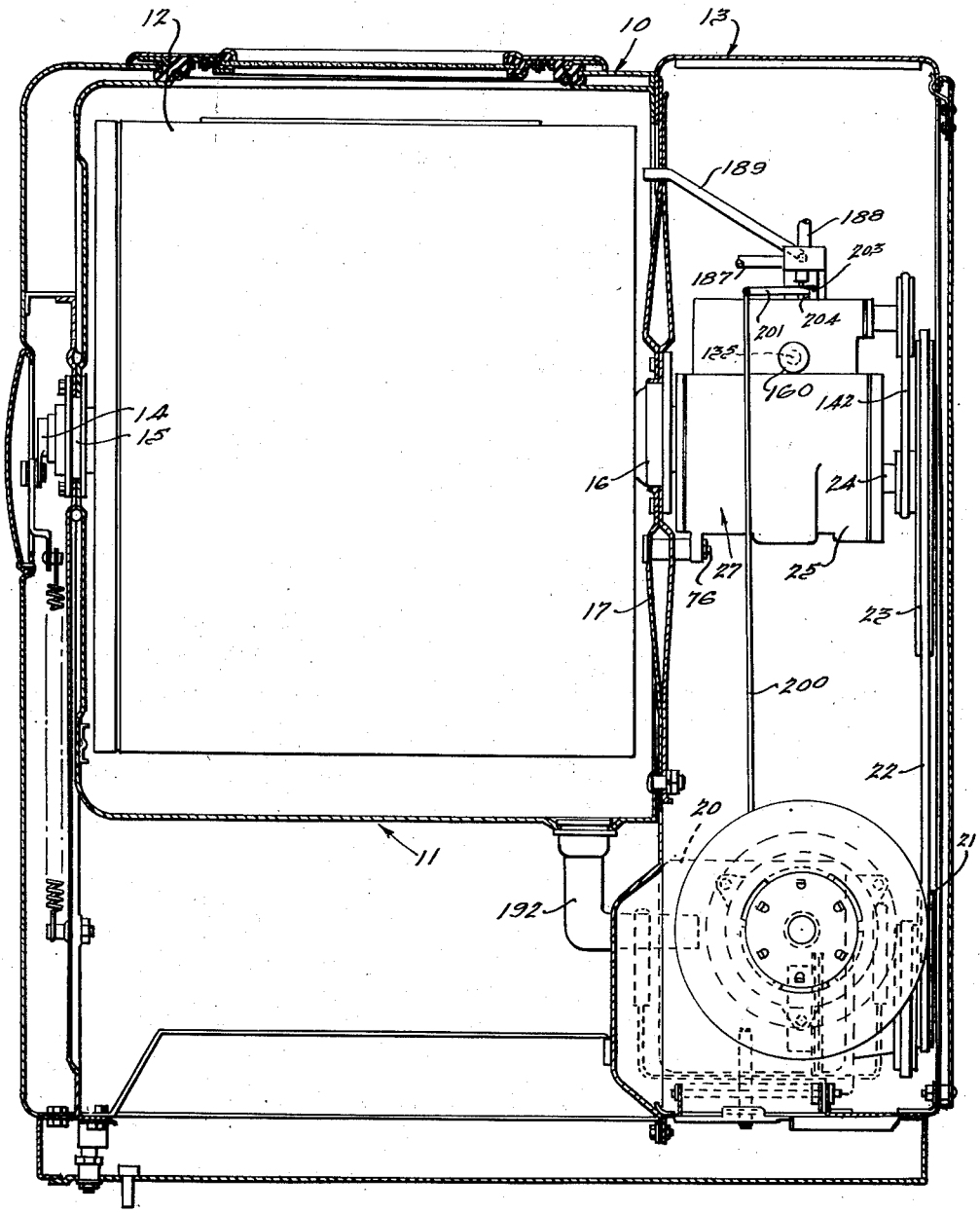
Figure 1 is a vertical view in cross-section showing a general arrangement of a washing machine constructed according to the present invention.

The cabinet construction employed in connection with the present invention may generally correspond to the cabinet construction embodied in the copending application for patent of Hyman D. Brotman, previously identified, and therefore it seems unnecessary to refer in detail to the construction. It comprises generally a part 10 containing a tub 11, a rotatable, perforated clothes receptacle 12 and a second part 13 in which the drive unit and other parts of the mechanism are located. The clothes receptacle is rotatable about a horizontal axis and at one end has a trunnion 14 journalled in a bearing 15, while its other end has a tubular stub shaft journalled in a bearing 16 mounted in a partition 17 dividing the cabinet into parts 10 and 13. This tubular stub shaft permits connecting and disconnecting a drive unit from the receptacle merely by inserting a splined end of the drive shaft forming part of the drive unit as will be hereinafter mentioned. The drive means for operating the receptacle comprises an electric motor 20 having a pulley 21 engaged by a belt 22 in turn trained about a pulley 23 on the outer end of a shaft 24 projecting from a drive unit 25.

Figure 2:
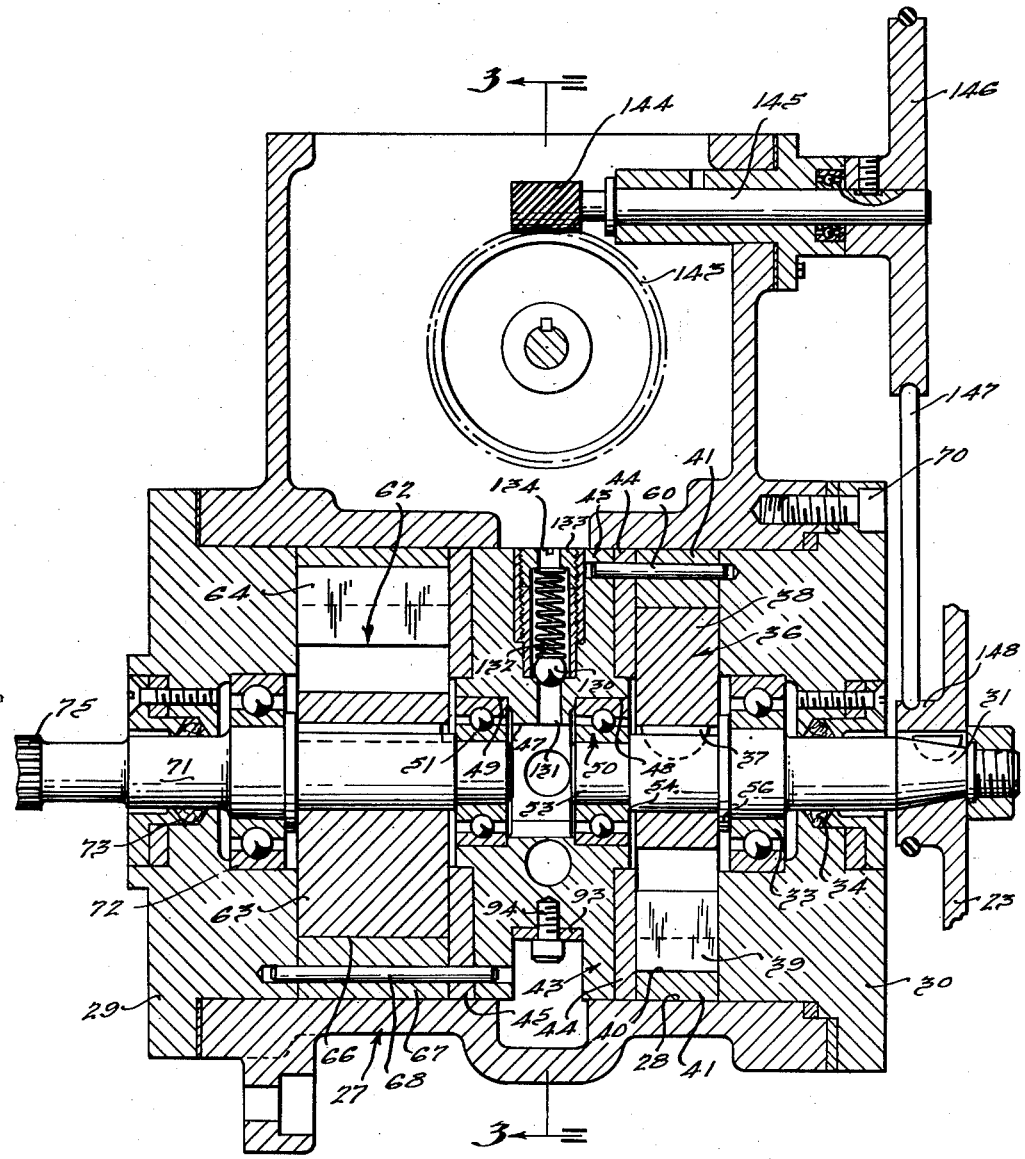
Fig. 2 is a cross-sectional view of the hydraulic drive unit as seen substantially along the line 2—2 of Fig. 3.

Now referring to Fig. 2 in particular, the drive unit 25 comprises a casing 27 having a cylindrical bore 28 therein and end bearing plates 29 and 30 closing the ends of the bore. The pulley 23 is drivingly connected to the end of a stub shaft 31 which is journalled in a bearing 33 mounted in the plate 30, and in order to prevent the escape of liquid from the interior of the casing 27, a suitable sealing means 34 is provided in plate 30 around the shaft 31. At its inner end the shaft 31 is drivingly connected to a pump rotor 36 by means of a key 37, and this pump may be of conventional character and as shown includes a body 38 having radial blades 39. These blades are slidable in radial slots provided in the body 38 and the outer edges of the blades are adapted to slidingly contact the inner periphery 40 of a stationary ring 41 located in the bore 28. The inner periphery 40 of the ring 41 is eccentric to the axis of the body 38 and consequently as the latter is rotated, the blades move inwardly and outwardly in their radial slots. If desired, springs may be mounted in the slots to press against the radially inner ends of the blades so as to cause the blades constantly to be urged outwardly into contact with the periphery 40.

Next to the pump 36 a valve body 43 is located in the bore 28 and this valve body includes a valve plate 44 next to the pump 36 and a valve plate 45 at the opposite end of the valve body. The valve body has a central bore 47 which is enlarged at opposite ends as indicated at 48 and 49 and in these enlarged ends of the bore, bearings 50 and 51 are provided. The bearing 50 rotatably supports the inner end 53 of the shaft 31 and it might be mentioned in this connection that the shaft has shoulders 54 and 56 for properly locating the shaft in relation to the bearings. A pilot or locating pin 60 extends through openings in the valve body 43, the valve plate 44, the eccentric ring 41 and in the plate 30 so as to locate these parts in predetermined circumferential positions.

Between the valve body 43 and plate 29, a hydraulic motor 62 is provided and this motor may comprise a body 63 having blades 64 located in radial slots in the body. The motor is substantially like the pump excepting that fluid supplied to it drives it instead of the blades driving the fluid as in the case of the pump. The outer edges of the blades are adapted to contact the inner periphery 66 of a ring 67 located between the valve plate 45 and plate 29, and the inner periphery of the ring is eccentric to the motor axis. It might be noted, however, that the eccentricity of the ring in the motor is opposite to the eccentricity of the ring in the pump. A pilot pin 68 extending through openings in the ring 67, valve plate 45, valve body 43, and end plate 29 locates the parts in predetermined circumferential positions. The end plates 29 and 30 are fastened to the casing 27 by bolts 70, and from this it follows that the assembly so far described is fixed in circumferential positions excepting, of course, for the rotary parts.

The motor body 63 is keyed to a shaft 71 having its inner end journalled in the bearing 51 and its outer end journalled in a bearing 72 located in the end plate 29. A suitable seal 73 around the shaft 71 prevents the escape of liquid from the housing 27. At its outer end the shaft 71 has a splined portion 75 which is adapted to be inserted into a splined sleeve in the tubular shaft portion connected to the clothes receptacle 12. This releasable spline connection may generally correspond to the connection disclosed in the previously identified copending application for patent, and it is to be understood that the drive unit 25 therefore may be easily disconnected from and connected to the clothes receptacle. As shown by Fig. 1, the housing 27 may be connected to the partition 17 by bolts 76.

Generally it might be said now that the means for driving the receptacle comprises an electric motor which directly drives the pump 36 in the casing 27 and the fluid from this pump is directed to the motor 62 so as to cause the latter to drive the receptacle. The receptacle is driven first in one direction and then the other by reversing the motor 62 and this result is obtained by controlling the flow of fluid from the pump to the motor and also controlling the exhaust of fluid from the motor. Such reversing movement of the motor occurs during washing and rinsing stages of the cycle of operation and after rinsing, the flow of fluid from the pump to the motor is increased so as to cause the motor to operate at a much higher speed in order to effect centrifugal drying of the clothes. Controls used in changing from the washing to the drying speeds also include a control for predetermining the direction of rotation of the motor in the high speed drying stage. Also in the automatic operation of the machine, controls are provided for causing water first to be supplied to the tub for washing the clothes, for causing the water to be drained at the end of the washing stage, for then causing inlet and drainage of water for a plurality of rinsing periods and then for causing drainage of water when high speed drying is to be effected. Finally, the controls include a means for starting the electric motor, for stopping it at the end of a cycle of operation and for advancing through or omitting of any stage of operation so that the cycle of operations may be shortened or so that one or more stages of operation may be omitted.

Now directing attention to Figs. 3 to 7, inclusive, the valve body 43 has a pair of vertical bores 80 and 81 disposed at opposite sides respectively of the axis of the body, and these bores have valve sleeves 82 and 83 fixed firmly therein. A valve element 84 having spaced heads 85 and 86 is slidable in the sleeve 82 while a similar valve 87 having spaced heads 88 and 89 is slidable in the sleeve 83. These valves are normally urged upwardly by springs 90 and 91 in the lower ends of the sleeves and which engage the heads 86 and 89 at their upper ends and a strip or plate 93 at their lower ends. The strip 93 is secured to the valve body by a bolt 94 and opposite ends of the strip have openings as indicated at 95 to allow the lower ends of the valves to move freely through the strip. It will be noted that both ends of the sleeves are open to the interior of the casing 27. At their upper ends the valves 84 and 87 have ends which are rectangular in cross section, and these ends are guided in slots 97 and 98 in a block 99 secured to the body 43 by bolts 100. Downward movement of the valves at predetermined times is effected by cams which presently will be described and return and upward movement of the valves so that they will follow the cams is effected by the springs 90 and 95.

Water or other liquid fluid for the drive unit is contained within the casing 27 and feeds to the pump by means of a set of grill openings shown best by Figs. 5 and 6. These grill openings lead to the inner side of the valve plate 44 and with the plate in position, the openings communicate with an arcuate slot 102. As the blades at the opposite side of the plate 44 move over this slot 102, fluid is drawn through the grill openings 101 and through the slot 102 and is carried by the blades beyond the end of the slot. This movement of the fluid into the spaces between the blades occurs as the blades are moving radially outwardly and then, of course, as the blades pass the high point of eccentricity in the sleeve 41, the space between the blades must decrease and the fluid in this space is discharged as the space decreases. Discharge of the fluid occurs through an opening 103 in plate 44, and this opening at the inner side of the plate communicates with a groove 104 which in turn communicates with an opening 105 in the valve body 43.

Figure 3:
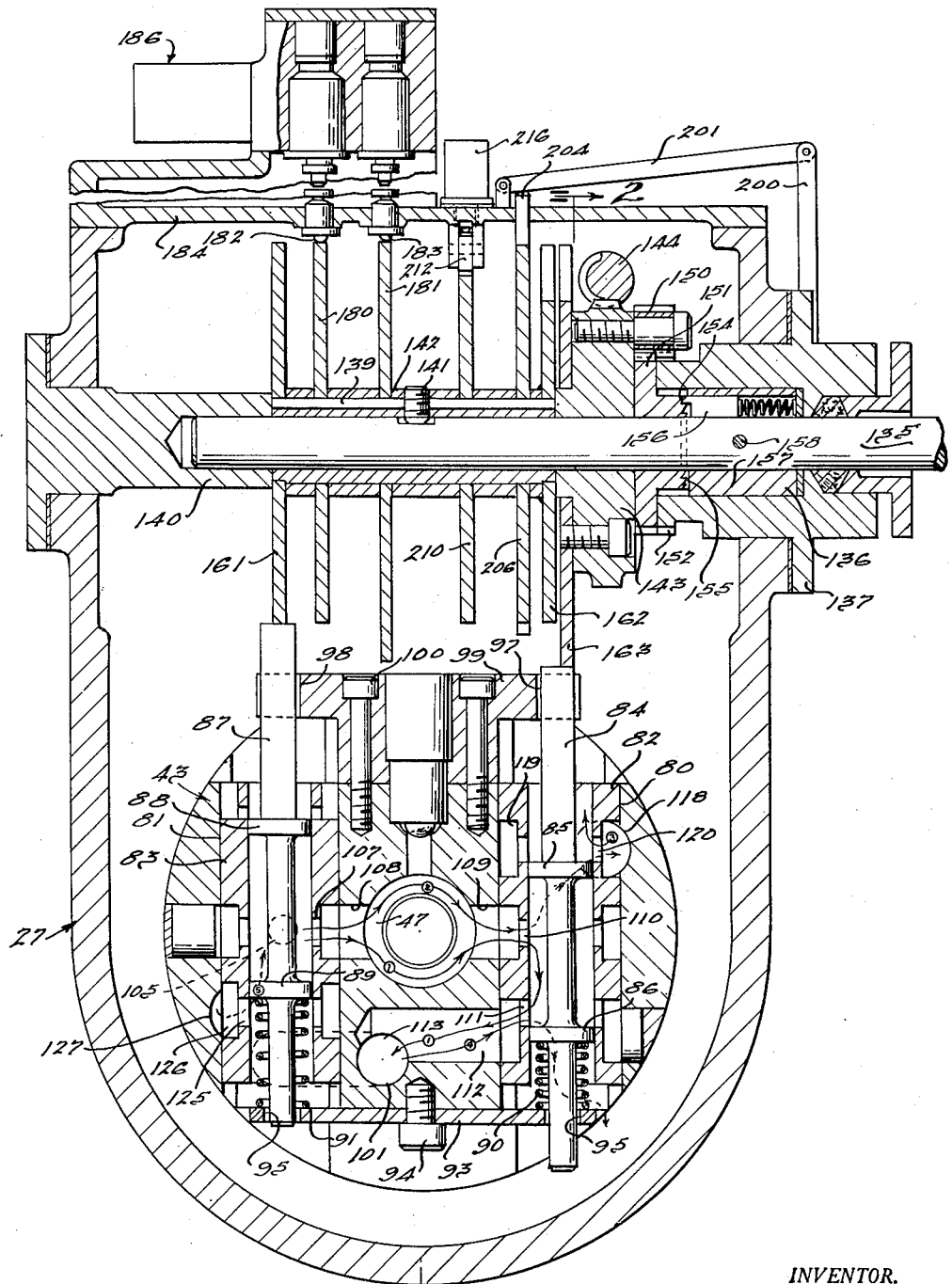
Fig. 3 is a cross-sectional view of the unit as seen substantially along the line 3—3 of Fig. 2.

Now referring to Fig. 3, fluid entering the opening 105 enters a groove 106 in the valve sleeve 83 and through this and openings 107 in the sleeve to a radial opening 108 leading to the bore 47 in the valve body. The fluid then flows, as shown by the arrow line marked 1, through an opposite radial opening 109 in the valve body which communicates with openings 110 in the sleeve 82 between the two valve heads 85 and 86. With the valve element 84 in its depressed position, the fluid then flows downwardly and then enters openings 111 in the sleeve which are in communication with a bore 112 in the valve body. This bore in turn communicates with an opening 113 leading to the motor end face of the valve body 43, as best shown by Fig. 7, and at this side of the valve body, the opening 113 communicates with a circumferentially extending groove or space 114 in the face of the valve body.

With the end plate 45 in place, the fluid in space 114 flows through a circumferentially extending opening 115 in the valve plate 45 and consequently the fluid then may flow into the space between blades of the motor. The direction of travel, of course, will be in the direction wherein the space between the blades will increase and consequently, fluid supplied to the groove 115 will cause the motor to operate in a predetermined direction. Fluid is exhausted at the diametrically opposite side of the motor through a circumferentially extending groove 116 in the plate 45, and from this groove it enters a groove 117 in the valve body which communicates with an opening 118 leading to an annular groove 119 around the upper end of the valve sleeve 82. From this groove the fluid enters openings 120 in the sleeve and then flows outwardly through the end of the sleeve and into the casing. From this it should be understood that with the pump driven by the electric motor, fluid will be supplied from the pump to the motor so as to cause it to rotate in a predetermined direction.

Reversal of the motor is effected simply by allowing the valve element 84 to shift upwardly so as to cause the head 86 on the valve to move above the openings 111 in the valve sleeve 82 and to cause the valve head 85 to move above the openings 120 in the valve sleeve. When this occurs, fluid will enter through the opening 105 as previously mentioned and will flow through the valve body along the arrow line indicated at 2, and then it will flow through the sleeve 82 and with the head 85 above the openings 120, it will then flow through these openings and into the opening 118. Now referring to Fig. 7, the fluid entering opening 118 will flow into the circumferential opening 116 in the valve plate 45 and thus enter the motor from the diametrically opposite side. This automatically will cause the motor to reverse.

Fluid is exhausted from the motor through the circumferential opening 115, through the opening 113 and again referring to Fig. 3, the fluid now will exhaust as shown by the arrow line 4 through the openings 111, and then since the head 86 is above the openings 111, it will flow downwardly and exhaust from the lower end of sleeve 82. From this it should be evident that reversal of the motor periodically can be obtained merely by shifting the valve element 84 upwardly and downwardly. The openings in the plate and in the valve body indicate how this reversal is effected, and it should be understood that the openings may be varied or that bleed openings or grooves may be provided where necessary so as to avoid any possibility of fluid being trapped and thereby avoid any interference with rotation of the motor or pump as the case may be.

In order to effect high speed rotation of the motor when drying of the clothes is to be effected, a greater amount of fluid is supplied to the motor, and this is accomplished as follows. The valve element 87 is shifted downwardly by a cam, presently to be mentioned, so as to cause the head 89 to be moved below openings 125 in the valve sleeve 83. These openings communicate with an annular groove 126 in the sleeve and the groove in turn communicates with an opening 127 in the valve body and which, as best shown by Fig. 6, leads to the right end face of the valve body. The opening 127 in the right end face of the valve body is in communication with a circumferential slot 128 in the plate 44. It is now evident that fluid may be discharged from the pump not only through the opening 103, groove 104, and opening 105, but that it also may enter the opening 108 and flow through the opening 127.

Reverting back to Fig. 3, it is now evident that fluid entering opening 127 may flow into the space in the valve sleeve 83 shown by the arrow line 5 between the heads 88 and 89 since the head 89 is in its lower position, and that it then may flow through the valve body and to the opposite sleeve 82. If the valve stem 84 continued its reversing movement, the motor would operate at a higher rate of speed and continue reversing, but it is desired only to rotate the motor in one direction at this higher speed and accordingly when the high speed control valve 87 is moved downwardly, it is desired that the reversing valve 84 be held in one position. As will be seen presently, means are provided for maintaining the valve 84 in its lower position when the valve 87 is shifted and during the time the latter is held in its lower position.

If for any reason the pressure on the fluid should develop to an undesirably high amount, a relief or bypass is desirable and this bypass as shown by Fig. 2, may comprise a ball 130 normally closing the upper end of a radial opening 131 in the valve body leading to the bore 47. This ball is normally held against its seat by a spring 132 and the spring is retained in position by a threaded bushing 133 having a central opening 134 through which the fluid may escape in the event the pressure forces the ball off its seat.

For effecting automatic operation of the valves in predetermined relation, a cam arrangement is provided as best shown by Fig. 3. Referring to this figure, the cam arrangement includes a cam shaft 135 which is turnable in a sleeve bearing 136 mounted in a bushing 137 secured in an opening in the housing. This shaft at its opposite end is turnable in a similar bushing 140 extending through an opening in the opposite side of the housing. This shaft is keyed by means of a stud 141 to a sleeve 142, and the sleeve in turn carries and is keyed by a key 139 to all of the cams for controlling the mechanism with the exception of the cam for effecting reverse movement of the valve 84. Since the washing cycle requires a substantially long period of time on the order, for instance, of forty minutes, it is necessary that the shaft 135 and hence the sleeve 142 be driven at a very slow rate of speed and in fact turned through one complete revolution in the period of time mentioned.

For effecting this slow drive, a worm wheel 143 is mounted on the shaft 135 and this wheel in turn is driven by a worm 144 mounted on the inner end of a shaft 145 extending through the casing wall. The outer end of this shaft is keyed to a pulley 146 which is driven by a belt 147 and in turn the belt is driven by a pulley portion 148 on the previously mentioned pulley 23. The worm wheel 143 carries at one point on its periphery a small rotary pinion 150 and this pinion meshes with the teeth on a second pinion 151 which is also turnable on the shaft 135. Also the pinion 150 meshes with teeth 152 formed on the inner end of the stationary bushing 137. One more tooth is provided on the pinion 151 as compared to the number of teeth on pinion 152 and consequently when the pinion 151 travels around on the teeth of pinion 152, the pinion 151 will turn very slowly and during one revolution of the worm wheel 143, the pinion 151 will turn only the distance between the two teeth.

The pinion 151 is provided with one-way clutch teeth 154 which engage a spring-pressed dog 156 slidably mounted in a sleeve element 157 secured to the shaft 135 by means of a cross pin 158. When the pinion 151 is turning in one direction, therefore, it will drive the sleeve and hence, the shaft and cams thereon but the driving connection permits independent turning of the shaft and sleeve as will be readily evident. Such independent or advancing rotation of the shaft 135 may be effected by means of a knob or wheel 160 on the outer end of the shaft, as shown by Fig. 1. This permits the cams to be advanced to any degree desired and hence, the washing machine operation to be advanced accordingly.

Control of the rotational movement of the clothes receptacle is effected by cams 161 and 162 fastened to the sleeve 142 and a third cam 163 fastened to the worm 143. The cam 163 turns relatively fast as compared to the cams 161 and 162 and, for example, may make two revolutions per minute while the cams 161 and 162 may make one revolution in forty minutes. Both of the cams 162 and 163 are aligned with the upper end of the valve element 84 while the cam 161 is aligned with the upper end of valve element 87.

Figure 14:
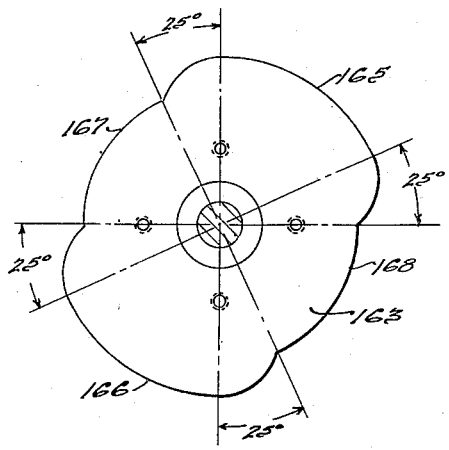
Fig. 14 is a side view of the cam which so controls a valve as to cause periodic reverse rotation of the receptacle.

Directing particular attention to Fig. 14, the cam element 163 has two high portions 165 and 166 and two intermediate or low portions 167 and 168. The high portions 165 and 166 cause the valve element 84 to move downwardly whereas the low portions 167 and 168 allow the valve to be returned by the spring 90. Twice in each revolution of the cam, therefore, the valve moves downwardly and likewise twice in each revolution it moves upwardly. This means then that the motor is reversed twice in each revolution of the cam and since the cam turns twice in one minute, the motor is reversed four times in one minute. Normally it is desired that the receptacle will be turned through about 7 to 10 revolutions before it is reversed.

Figure 15:
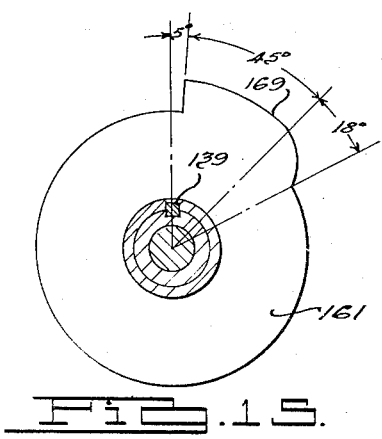
Fig. 15 is a side view of a cam which controls another valve for effecting high speed rotation of the receptacle.
Figure 16:
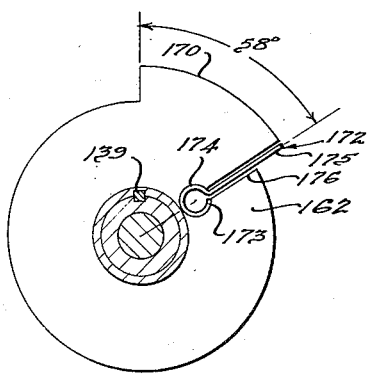
Fig. 16 is a side view of a synchronizing cam device for insuring that the receptacle will be rotating in a predetermined direction when the high speed drying operation is to occur; and, Fig. 17 is a view showing the various steps that occur in the cycle of automatic operation.

Now referring to Fig. 15, the cam 161 has a high portion 169 adapted to depress the valve element 87 after the cam has turned through a major portion of its revolution. After a long period of washing machine operation, therefore, and after expiration of the major portion of the forty minutes mentioned, the high part 169 of the cam will depress the valve element 87 and as previously described, the motor will rotate at a higher speed. Before this is effected, however, it is desirable that the valve element 84 be held in its lowermost position, and this is accomplished by the cam element 162. Referring to Fig. 16, it will be noted that this cam has a high portion 170 generally corresponding to the high portion 169 of the cam 161 but it is of greater circumferential length so that the high portion 170 of the cam 162 is in a position where it holds the valve element 84 depressed while the high portion 169 of cam 161 is holding valve element 87 depressed.

In order to insure that the high portion 170 of cam 162 will ride over the end of valve element 84 instead of engaging the side of the valve element at a time when the valve is in its raised position, an auxiliary retaining spring element 172 is provided on the cam. This spring element includes a circular end portion 173 fitted tightly in an opening 174 in the cam 162 and a radially projecting spring portion 175 extending outwardly through a radial slot 176 next to the high portion of the cam. The width of the slot and its relation to the projecting spring portion 175 are such that if the valve element 84 is in its raised position when the spring element contacts the side of the valve element during movement of the cam, the spring portion will flex sufficiently to allow the valve element to be returned by cam 163 without causing any binding of the high portion 170 of cam 162 against the side of the valve element. Assuming then that the valve element 84 is in its raised position when the spring 175 contacts the side of the valve element, the spring will flex until the valve element is depressed by cam 163 and then the outer end of the spring will reversely flex as a result of its spring action until it is under the end of the valve element. When this occurs, the cam 163 can continue moving as it will and the valve element 84 will remain depressed since the end of spring portion 175 and the high part 170 of cam 162 will now act to hold the valve depressed. From this explanation it should be evident now that the receptacle may be reversely rotated and then rotated at high speed in one direction only.

For controlling the inlet of water to the tub 11, a pair of cams 180 and 181 are provided on the cam sleeve 142, and these respectively engage valve stems 182 and 183 shown by Fig. 3, projecting through the upper cover wall of the casing indicated at 184. These valves extend upwardly into and form part of a thermostatically controlled valve device 186. As shown by Fig. 9 in conjunction with Fig. 3, the valve device 186 has a cold water inlet 187, a hot water inlet 188, and a line 189 leading to the upper part of the tub 11. When the valve stem 182 is raised by cam 180, water at a higher temperature flows from the device to the tub and then when this valve is closed and the valve 183 is open, water at a lower temperature flows to the tub. It does not seem necessary to describe a valve such as this in detail and if desired a valve such as shown in the previously mentioned Hyman D. Brotman application for patent may be used. As presently will be mentioned in more detail in connection with the cams, the water at the higher temperature is allowed to flow to the tub for initial washing of the clothes and then for subsequent rinses, the valve 183 is opened to allow water at a lower temperature to flow to the tub.

Water is drained from the tub by means of a drain 192 connected to the bottom of the tub and this drain leads to a valve chamber 193 shown by Fig. 8 in particular, which has a valve 194 for controlling the flow of water. The valve chamber forms part of a centrifugal pump 195 and this pump is connected to a drain 196 which in turn may be connected to an exterior drain. The pump is driven by the pulley 197 engaging a belt 198 and the belt in turn engages a pulley 199 on the shaft of the electric motor. The valve 194 is connected to a vertically extending operating rod 200 and as shown by Fig. 1, this rod at its upper end is connected to an arm 201 in turn pivoted as indicated at 203 on the casing cover 184.

Now referring to Fig. 3 in conjunction with Fig. 1, the arm 201 is engaged by the upper end of a pin 204 projecting upwardly from the cover 184, and this pin projects downwardly and is engaged by cam 206 on the sleeve 142. When the pin 204 is moved upwardly the valve 194 opens and then when the pin moves downwardly, the valve closes either by reason of gravity or if desired, the valve may be spring pressed as indicated at 208 in Fig. 8, so that it will be closed by the spring.

The electric motor is started at the beginning of the cycle and is stopped at the end of the cycle by cam 210 which as best shown by Figs. 3 and 10, engages an arm 212 pivoted on the underside of cover 184. This arm is in contact with a switch operating pin 215 extending through the plate 184 and when the plate is pushed upwardly, a switch 216 in the motor circuit is closed and then when the arm drops, the switch is opened. It will be noted that the cam has a notch 217 adapted to receive a corresponding projection 218 on the arm 212 and when this projection drops into the notch, the switch is open and at all other times the switch is closed since the high part of the cam engages the projection 218.

Figure 13:
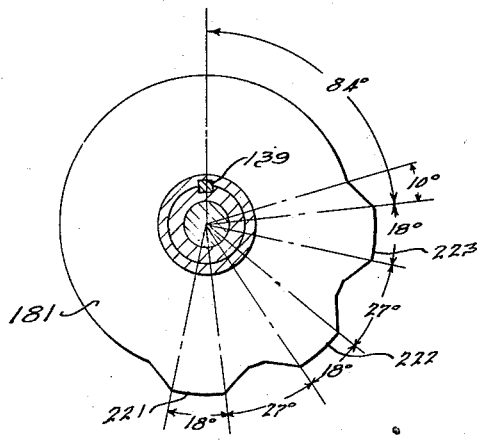
Fig. 13 is a side view of the cam which controls the inlet of water for rinsing the clothes.
Figure 12:
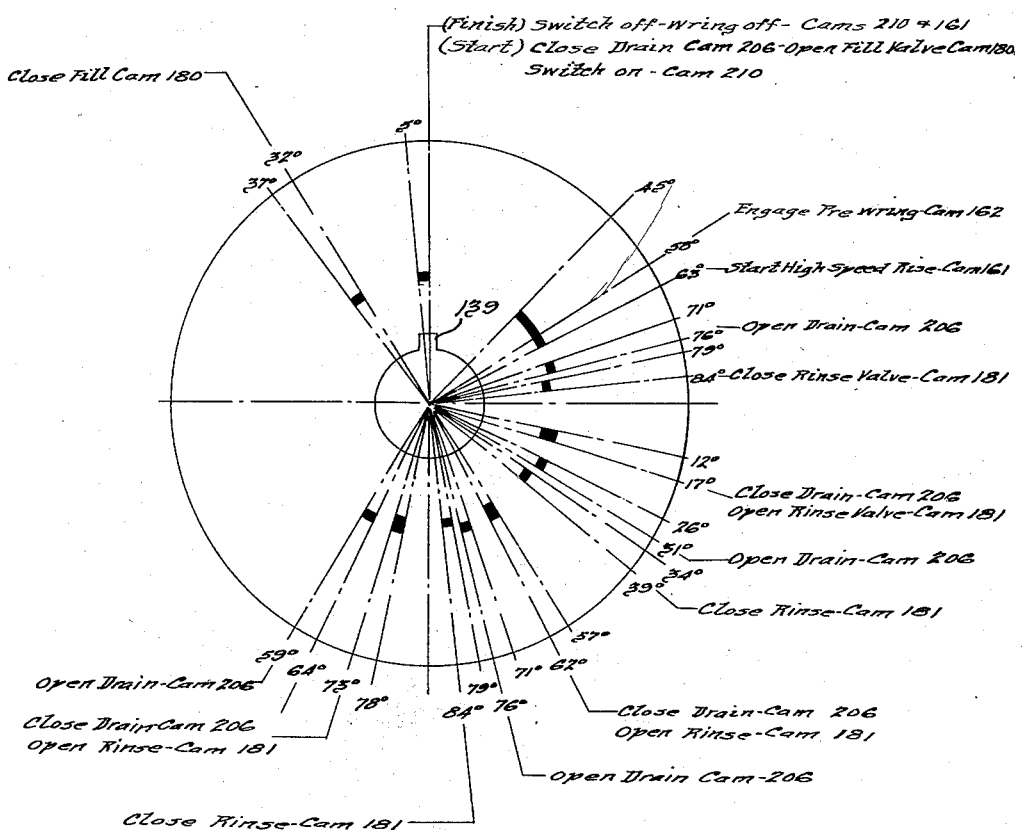
Fig. 12 is a side view showing the cam which controls the drainage of water from the tub.

Referring now briefly to Figs. 11, 12, and 13, it will be noted that the cam 180 in Fig. 11 which governs the first inlet of water has a single high portion indicated at 220 so that this cam controls water initially entering the tub for washing purposes. The cam 181 shown by Fig. 13, has three high portions 221, 222, and 223 so as to cause rinsing water to enter the tub at three different times in order to effect rinsing at three different periods in the operation. The drain control cam indicated at 206 in Fig. 12, has three portions 225, 226, and 227 and a longer high portion 228. The first three high portions drain the water respectively at the end of the washing operation and the first two rinses, while the longer high portion 228 drains the water at the end of the third rinse and holds the drain open during the high speed drying operation.

Now referring to Figs. 3 and 10 to 17, the washing operation is as follows. With the projection 218 on cam 210 in the notch 217, the machine is stopped since the circuit to the motor is broken. At the same time, the high speed control valve 87 is in its upper position since the high cam portion 169 on cam portion 161 has allowed the valve to move upwardly. With particular reference to the cam 206 controlling the drainage of water, it will be observed that the drain valve is open. Now by turning the cam shaft 135 by means of the knob on its outer end, the cam 210 will be turned sufficiently to cause the notch 217 to move past the projection 218 on the switch arm 212, and this will close the switch to the electric motor and operation of the machine will begin. When the motor starts, the cam shaft then will be driven by the motor and from here on the operation will be automatic until the projection 218 on the switch arm drops again into the notch 217.

When the motor starts, the first thing that occurs is that the cam 206 moves to allow the drain to close while the cam 180 will open the valve 182 to allow water to enter the tub. This entry of water will continue as long as the high portion 220 on the cam holds the valve open and if desired, a float control may be placed in the line 189 leading from the thermostatic valve to the tub with the float control also connected to the bottom of the tub so that only a certain amount of water can enter the tub. Such a float control is provided in the Hyman D. Brotman application for patent previously identified. While the water is entering the tub and thereafter, the receptacle will reversely rotate due to the action of the cam 163 causing the valve 84 to reciprocate, and the washing action continues until the high part 225 on the drain cam 206 opens the drain valve, and then the water drains from the tub. The drain valve then closes and the water inlet valve 183 is opened by the first high part 221 on the cam 181. Water enters the tub then for a period of time which also may depend upon the float control mentioned and then the water inlet valve closes.

After a certain period of time, the drain then opens due to the portion 226 on the cam 206. Three rinses occur which are controlled in this manner by the inlet cam portions 221, 222, and 223 and the high portions on the drain valve, and then when the drain valve finally closes due to the high part 228 on the cam 206 opening the drain valve, the machine approximately is ready for drying. After a period of time with the drain valve thus open and which is sufficient to allow drainage from the tub, a uniform rise portion leading to the high part 169 of cam 161 acts to begin the movement of valve 87 downwardly and the synchronizing cam 170 acts to hold the valve 84 in its depressed condition.

The receptacle now will rotate in one direction only and as the high part 169 on the cam 161 acts to increase the fluid supply to the hydraulic motor, the receptacle is driven at the high drying speed. This speed continues until the high portion 169 on cam 161 allows the valve 87 to rise and then the machine slows down to it original reversing speed. The valve 84 is allowed to move upwardly by the synchronizing cam 170 after the valve 87 moves upwardly, and this movement of valve 84 may occur either at the end of the washing cycle or at the time the machine initially is started. Shortly after the movement of valve 87, the projection 218 drops into the notch 217 so as to stop the electric motor.

Although only one form of the invention has been illustrated and described in detail, it will be apparent to those skilled in the art that various modifications may be made without departing from the scope of the claims.

What is claimed is:

1. An automatic washing machine comprising a rotary clothes receptacle and a drive unit for rotating the receptacle, said unit comprising a hydraulic motor for driving the receptacle, means for supplying liquid under pressure to the motor, means including a pair of valves for controlling flow of the liquid to the motor, the first of said valves being movable between two positions and in one position causing liquid to flow to the motor to turn it in one direction and in the other position causing the liquid to flow to the motor to turn it in the other direction, the second valve being movable from a first position where it allows a reduced flow of liquid to a second position where it allows a larger flow so as to increase the speed of the motor, and automatic means for operating the valves in predetermined relation.

2. An automatic washing machine comprising a rotary clothes receptacle and a drive unit for rotating the receptacle, said unit comprising a hydraulic motor for driving the receptacle, means for supplying liquid under pressure to the motor, means including a pair of valves for controlling flow of the liquid to the motor, the first of said valves being movable between two positions and in one position causing liquid to flow to the motor to turn it in one direction and in the other position causing the liquid to flow to the motor to turn it in the other direction, the second valve being movable from a first position where it allows a reduced flow of liquid to a second position where it allows a larger flow so as to increase the speed of the motor, automatic means for moving the first valve back and forth between its two positions so as to effect periodically reversed turning of the receptacle, and automatic means for moving the second valve at predetermined times to change the speed of rotation of the receptacle.

3. An automatic washing machine comprising a rotary clothes receptacle and a drive unit for rotating the receptacle, said unit comprising a hydraulic motor for driving the receptacle, means for supplying liquid under pressure to the motor, means including a pair of valves for controlling flow of the liquid to the motor, the first of said valves being movable between two positions and in one position causing liquid to flow to the motor to turn it in one direction and in the other position causing the liquid to flow to the motor to turn it in the other direction, the second valve being movable from a first position where it allows a reduced flow of liquid to a second position where it allows a larger flow so as to increase the speed of the motor, automatic means for moving the first valve back and forth between its two positions so as to effect reverse turning of the receptacle, automatic means for moving the second valve at predetermined times to change the speed of rotation of the receptacle, and means operable automatically to maintain the first valve in one of its positions only when the second valve is shifted and held in the position to which it is shifted.

4. An automatic washing machine comprising a rotary clothes receptacle and a drive unit for rotating the receptacle, said unit comprising a hydraulic motor for driving the receptacle, means for supplying liquid under pressure to the motor, means including a pair of valves for controlling flow of the liquid to the motor, the first of said valves being movable between two positions and in one position causing liquid to flow to the motor to turn it in one direction and in the other position causing the liquid to flow to the motor to turn it in the other direction, the second valve being movable from a first position where it allows a reduced flow of liquid to a second position where it allows a larger flow so as to increase the speed of the motor, automatic means for moving the first valve back and forth between its two positions so as to effect reverse turning of the receptacle, automatic means for moving the second valve at a predetermined time to its second position where the flow of liquid to the motor is increased so as to increase the speed of the motor, and automatic means to hold the first valve in one position only while the second valve is in its second position.

5. An automatic washing machine comprising a rotary clothes receptacle and a drive unit for rotating the receptacle, said unit comprising a hydraulic motor for driving the receptacle, means for supplying liquid under pressure to the motor, means including a pair of valves for controlling flow of the liquid to the motor, the first of said valves being movable between two positions and in one position causing liquid to flow to the motor to turn it in one direction and in the other position causing the liquid to flow to the motor to turn it in the other direction, the second valve being movable from a first position where it allows a reduced flow of liquid to a second position where it allows a larger flow so as to increase the speed of the motor, cam controlled means for moving the first valve back and forth between two of its positions so as to effect reverse turning of the receptacle, cam means for moving the second valve at a predetermined time to its second position, and cam means for holding the first valve in one position while the second valve is in its second position.

MERTON F. WILCOX.

REFERENCES CITED

The following references are of record in the file of this patent:

UNITED STATES PATENTS

| Number | Name | Date |
|---|---|---|
| 1,433,125 | Edmands | Oct. 24, 1922 |
| 1,611,895 | Dienner | Dec. 28, 1926 |
| 1,849,283 | Crane | Mar. 15, 1932 |
| 1,954,261 | Pierce | Apr. 10, 1934 |
| 2,056,833 | Davis | Oct. 6, 1936 |
| 2,236,748 | Chayie | Apr. 1, 1941 |
| 2,331,897 | Dyer | Oct. 19, 1943 |
| 2,475,503 | Holthouse | July 5, 1949 |